United States Patent [19]

Holland et al.

[11] Patent Number: 5,206,936

[45] Date of Patent: Apr. 27, 1993

[54] APPARATUS FOR EXCHANGING CHANNEL ADAPTER STATUS AMONG MULTIPLE CHANNEL ADAPTERS

[75] Inventors: Hugh C. Holland, Brackney, Pa.; Robert J. Kammerer, Endicott; Ronald S. Svec, Berkshire, both of N.Y.

[73] Assignee: International Business Machines Corporation, Armonk, N.Y.

[21] Appl. No.: 575,593

[22] Filed: Aug. 31, 1990

[51] Int. Cl.⁵ .............................................. G06F 13/12
[52] U.S. Cl. .................................... 395/325; 395/200; 364/238.3; 364/238.2; 364/264; 364/264.6; 364/241.9; 364/256.3; 364/DIG. 1
[58] Field of Search ................ 364/DIG. 1, DIG. 2; 395/325, 275, 200, 425, 575, 775; 370/85.1, 85.7; 340/825.06, 825.5, 825.03; 371/11.1, 11.2, 11.3, 20.1

[56] References Cited

U.S. PATENT DOCUMENTS

| | | | |
|---|---|---|---|
| 4,155,117 | 5/1979 | Mitchell, Jr. et al. | 364/200 |
| 4,159,518 | 6/1979 | Draper et al. | 364/200 |
| 4,418,382 | 11/1983 | Larson et al. | 364/200 |
| 4,495,564 | 1/1985 | Draper et al. | 364/200 |
| 4,571,671 | 2/1986 | Burns et al. | 364/200 |
| 4,868,783 | 9/1989 | Anderson et al. | 395/325 |
| 4,908,823 | 3/1990 | Haagens et al. | 370/85.1 |
| 4,991,085 | 2/1991 | Pleva et al. | 395/275 |
| 5,023,829 | 6/1991 | Shibata | 364/900 |
| 5,077,656 | 12/1991 | Waldron et al. | 395/325 |
| 5,097,410 | 3/1992 | Hester et al. | 395/275 |

OTHER PUBLICATIONS

EPO Search Report, Application Nos. EP 91111308 and 86107020, Search Completed on Jan. 2, 1992 and Sep. 1, 1988 Respectively.

EPA 0 205 949 to Oliver et al. (IBM), Dec. 30, 1986.

Cormier et al., "Channel-to Channel Adapter for I/O Interface Switching", IBM TDB vol. 13, No. 10, Mar. 1971, pp. 2951-2952.

"IBM System/360 Special Features Channel-to Channel Adapter", IBM Systems Reference Library, Feb. 1966.

"IBM System/370 Special Feature Description: Channel-to-Channel Adapter", IBM Systems, Mar. 1972.

Lynch et al., "Serial Channel to I/O Interface", IBM Technical Disclosure Bulletin, vol. 19, No. 8, pp. 3139-3143, Jan. 1977.

*Primary Examiner*—Michael R. Fleming
*Assistant Examiner*—Gopal C. Ray
*Attorney, Agent, or Firm*—Pollock, Vande Sande & Priddy

[57] ABSTRACT

A device information interface for a channel to channel I/O device having a plurality of channel adapters. A device interface bus interconnects each of the channel adapters, permitting an exchange of data between channel adapters. A virtual device storage array at each channel adapter stores the status of inactive channel devices associated with a connected channel. Inquiries as to the status of a logical adapter may be sent over the device interface bus. Logic circuits at the receiving adapter will decode the inquiry and address the virtual storage array to obtain the status of the logical adapter for forwarding over the bus to the inquiring adapter.

15 Claims, 10 Drawing Sheets

APPARATUS FOR EXCHANGING CHANNEL ADAPTER STATUS AMONG MULTIPLE CHANNEL ADAPTERS

RELATED APPLICATIONS (1) U.S. Ser. No. 09/575,576 filed Aug. 31, 1990, EN990026;

(2) U.S. Ser. No. 09/575,578 filed Aug. 31, 1990, EN990027; and, (3) U.S. Ser. No. 07/575,575 filed Aug. 31, 1990, EN990029.

The present invention relates to apparatus for establishing communication links between channels of large scale data processing systems. Specifically, a channel to channel interface having complete compatibility with IBM OEMI System/360 and System/370 channel protocol is described.

As disclosed in various references, such as "IBM/360 and System/370 I/O Interface Channel to Control Unit Original Equipment Information", such systems can address up to 256 I/O devices per channel. Each channel is usually employed to control up to eight control unit attachments. One attachment point may be associated with a single device control unit, a multiple device control unit, or multiple independent control units. The channels may communicate with multiple devices on the channel by addressing connected devices through unique device addresses.

Channels of different data processing systems may also be interconnected, using a pair of channel adapters connected to each other. The interconnected systems permit the sharing of workloads between processing systems, thus improving computing efficiency for the multiple processing systems. The channel adapters provide multiple logical channel adapters to a connected channel. The logical channel adapters of a first channel adapter are connected with matching logical channel adapters for another channel by a shared communications link for the two channels.

The channel adapter architecture used to connect multiple channels must be capable of handling asynchronous requests for a communication link, as well as resolving conflicts between channels requesting a communication link. Additionally, a capability must be provided to establish a priority for requests for a link assignment which promotes communication efficiency.

SUMMARY OF THE INVENTION

It is an object of this invention to provide a control unit for managing communications between multiple data processing systems.

It is a more specific object of this invention to couple data processing systems together to provide data sharing capability and workload sharing among the processing systems.

It is another object of this invention to provide a physical channel adapter for a processor channel which forms a plurality of logical channel adapters which may be linked to logical channel adapters of another channel adapter.

It is yet another object of the invention to allow logical channel adapters to acquire requisite information about each other in order to formulate correct responses to requests for communication by the channels.

These and other objects of the invention are provided by a control unit which intercouples a plurality of channels of multiple data processing systems. The control unit includes a plurality of channel adapters, each of which can form multiple logical adapters for the connected channels. Additionally, the control unit includes a plurality of data buses connecting all channel adapters.

A single logical adapter of one channel adapter may be linked with the matching logical adapter of another channel adapter if various criteria are met which promote an efficient use of the data bus assigned to link logical adapters.

Before a given logical adapter of one channel adapter can request a data bus assignment, the current status information of the given logical adapter and the matching logical adapter of another channel adapter must be examined. This examination is done in conformance with the IBM channel-to-channel adapter architecture. Only adapters which satisfy the various architectural conditions are capable of generating a request for a link between logical adapters. Thus, the adapters must exchange information relating to the mutual relative status of each other, and must meet the specific architected criteria in order to proceed with the connection.

In carrying out the foregoing objectives, each channel adapter is provided with a device information interface which interconnects each of the adapters through a device information interface bus. Status information may be acquired by any logical adapter about the matching logical channel adapter preparatory to making a link request with that matching logical adapter. A virtual device storage at each channel adapter permits the storage of information related to the status of the logical adapters associated with that adapter. Thus, the first criteria for generating a link request may be made at the channel adapter level.

Once a channel adapter has verified that the architected conditions are met, a link request will be generated. A supervisory processor is interrupted by this link request, and enters it in a link request table if other global criteria are met, insuring that conditions are present for an efficient use of an assigned data bus between adapters.

BRIEF DESCRIPTION OF THE FIGURES

FIG. 7-1 and 7-2 illustrate block diagrams of the steps executed by microprocessor 39 to supervise channel adapter interface traffic.

DESCRIPTION OF THE PREFERRED EMBODIMENT

Figure 1:
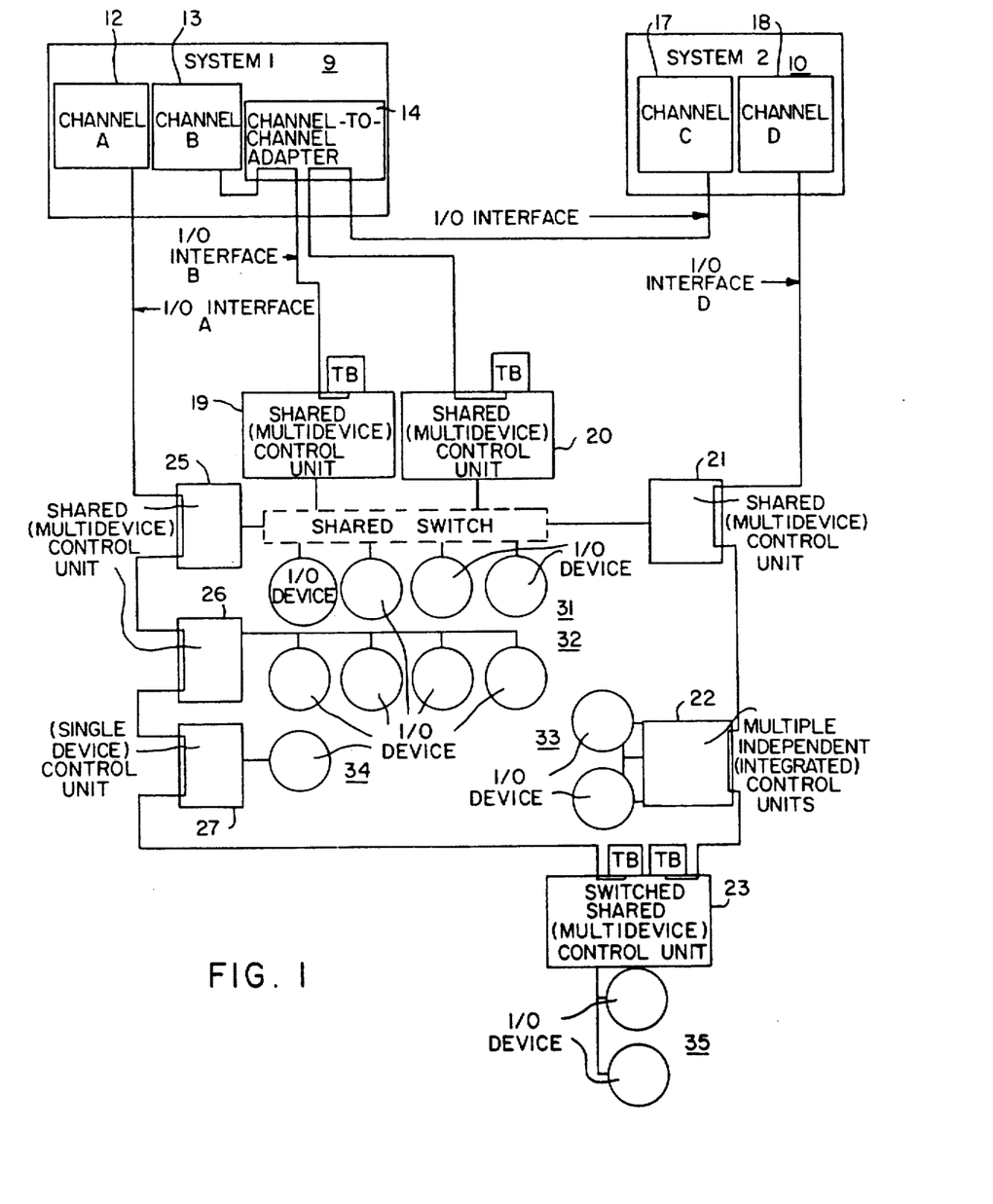
FIG. 1 illustrates an example of multiple channel configurations for large scale data processing systems using OEMI channel protocol.

Referring to FIG. 1, there is shown an example of a multiple processor, multiple channel configuration for accessing a plurality of I/O devices. FIG. 1 is illustrative of the IBM 370 System architecture which includes two processing systems 9 and 10. The two processing systems have input/output channels, 12, 13, 17 and 18, which are capable of accessing a plurality of control units 21, 22, 23, 25, 26 and 27. The control units recognize an address issued by the channel, and permit access to a connected single input/output device 34, or to multiple devices 31, 32, 33 and 35. It is also possible to couple channels of systems together, using a channel-to-channel adapter 14. In this way, the coupled systems, 9 and 10, may share data and workload.

The input/output interfaces associated with each channel 12, 13, 17 and 18, in the foregoing IBM 370 System architecture, operates in accordance with an OEMI protocol set forth in publications of the IBM Corporation, such as "IBM System/360 and System/370 I/O Interface Channel to Control Unit Original Equipment Manufacturers, Information". The essence of such channel-to-control unit operation is to permit multiple devices to be accessed by a given channel, as well as multiple channel and system access of a given device or device set. In the same setting, the channel-to-channel adapter 14 operation provides direct data and workload sharing between systems via their respective channels.

In coupling such OEMI channels together, channel-to-channel adapters are employed. The channel-to-channel adapters must provide for efficient transfer and exchange of information between separate channels in order that a minimum of wait time for data transfer is encountered when one channel wishes to communicate with a second channel.

Figure 2:
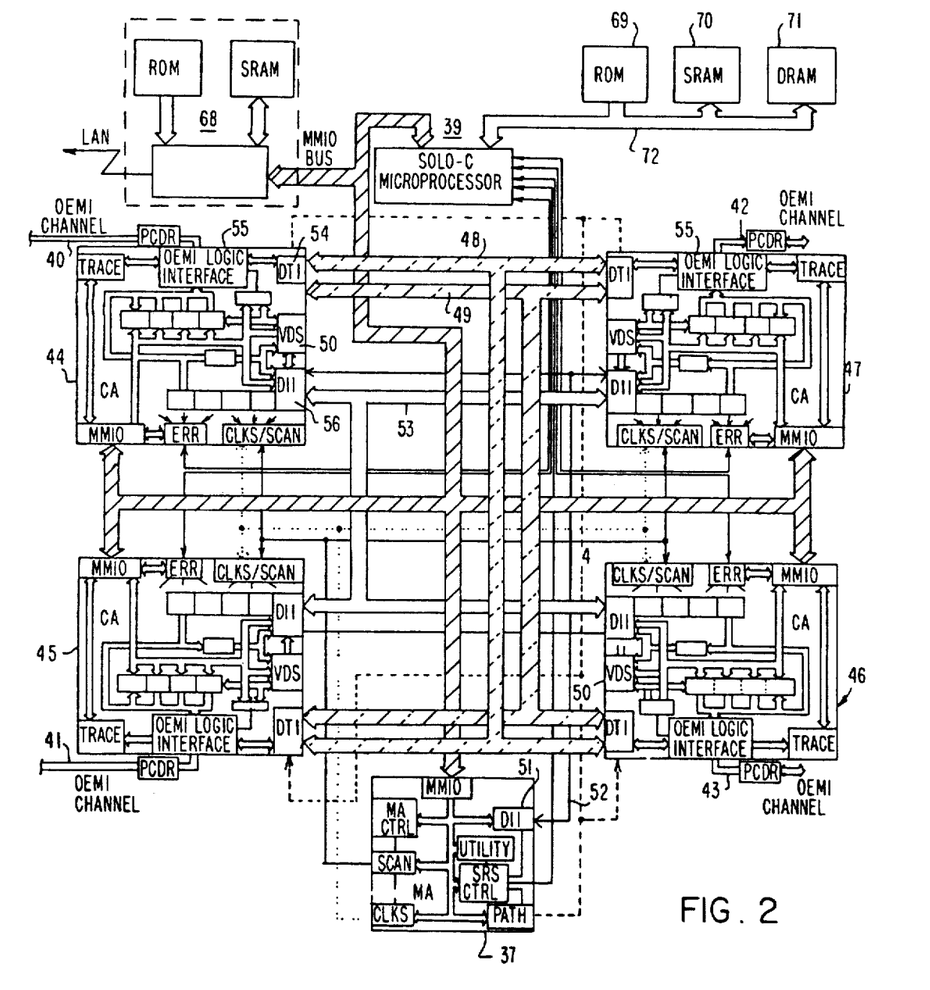
FIG. 2 illustrates a device for interconnecting multiple channels in a multiprocessor computing system which shares a data processing workload.

The present invention relates to such channel adapters, a preferred embodiment of which is shown in FIG. 2. FIG. 2 shows a system which provides channel adapters for four (4) separate processing systems. Each of the processing systems has a channel 40, 41, 42 and 43. Each of these channels requires a communication link to another channel, associated with another adapter. The adapters 44, 45, 46 and 47 are each capable of forming multiple time shared logical adapters with the remaining adapters. A logical adapter of one adapter forms a communication path, with a corresponding logical adapter of a second adapter, over one of two data buses 48 or 49. The adapters 44, 45, 46 and 47, permit the configuration of multiple logical adapters, only one of which may be connected at a given time to another adapter. Each of the logical adapters represent a device formed at a given instant of time to establish a link with another logical adapter of an adapter connected to a second channel. There are associated with each of the adapters, a plurality of potential logical adapters. Each of these logical adapters identifies one half of a connection to one of the other adapters through either of two data buses 48 and 49. The arrangement is such that an interrupt driven microprocessor 39 will link one logical adapter of one adapter to a logical adapter of a second adapter when various criteria, relating to the efficient transfer of data between logical adapters has been satisfied. The microprocessor 39 responds to an interrupt from any of the four channel adapters 44, 45, 46 and 47, or from a support processor connected to a LAN interface 68.

The addressing scheme for channel-to-channel linkage is based on the I/O address provided by the requesting channel. This address has a plurality of most significant bits which define the channel adapter through which the channel is attempting to establish a connection. The remaining plurality of least significant bits identify the logical adapter within the channel adapter, and the corresponding logical adapter in one of the other channel adapters. Thus, a single address received from a channel identifies a pair of logical adapters for which a communication link is sought.

Thus, if channel 40 requests a link to channel 43 of adapter 46, the respective adapter 44 will receive an address relating to a logical adapter of adapters 44 and 46, for which a connection is desired over one or the other data buses 48 and 49. The adapters are configured such that each communication link so formed is represented by an address, supplied from channel 40, identifying a logical adapter in adapter 44, as well as identifying a logical adapter identified with adapter 46.

Each of the logical adapters is treated as a device by a channel connected to the adapters 44, 45, 46 and 47. A device of adapter 44 may therefore be connected to its corresponding device in one of the remaining adapters 45, 46 and 47. It will be appreciated that only two communication paths over data buses 48 and 49 may be present at any given time. The need is thus present to arbitrate between asynchronous commands coming in on each of the channels 40 through 43, and assign a data path to a pair of adapters, depending on various criteria relating to the overall efficient data transfer, and refusing assignment of a data path to requests which do not meet this criteria.

In the preferred embodiment of the invention, it has been determined that efficient use of the two data buses 48 and 49 results by granting access only to channels which have met certain architected criteria of the channel-to-channel adapter architecture. Each adapter 44, 45, 46 and 47, when receiving a request to connect from any of its connected channels 40 through 43, will determine, using circuitry to be described, whether or not the various architected criteria exist for the channel for which a link is requested. If channel 40 requests a link, using logical adapters associated with adapter 44, to a logical adapter within adapter 46, the requesting adapter 44 will determine whether or not the associated logical adapter in adapter 46 meets the criteria to allow the link request to proceed.

Once this criteria has been determined to exist, a link request is made of the microprocessor 39 which will determine, in accordance with other global considerations, whether or not to store the link request in a link request table, such that the link can be granted to the two logical adapters, at the first available opportunity.

These global considerations include whether or not a previous request has been received to link with one of the adapters involved in a second request for a communications link. In accordance with the preferred embodiment, this condition will result in the link request not being added to the table, and a command to the subsequent requesting adapter to retry the request.

In following these global considerations, it is clear that channels having pending requests will be more likely to complete them, rather than the channels having newly-formed requests for a link.

In order to carry out the first condition for granting a link, i.e., that the logical adapter of a proposed link connection meet the architected criteria, circuitry is provided in each of the adapters 44, 45, 46 and 47 to identify the conditions of logical adapters, with which a potential communication link is to be established. Using a device information interface 56 associated with each adapter, and a virtual device storage array 50, it is possible to make inquiries regarding the logical adapter with which a link is sought. Using basic arbitration circuitry 51, shown in a separate maintenance adapter chip 37 connected by device information interface control lines 52, it is possible to grant access to the device information interface bus 53 such that the status of a logical adapter for which a communication link is to be formed may be read from the virtual device storage 50 of the adapter forming the logical device. Thus, when channel 40 requests to form a link with channel 43 over a communication link identified by logical device X of adapter 44, and logical device Y of adapter 46, state information regarding logical device Y may be obtained from the virtual device storage array 50 in adapter 46. Once successful arbitration by the device information interface 56 for access to the device information interface bus 53 is completed, the status of logical device Y may be obtained from the virtual device storage array 50. The device information for logical device X is likewise obtained from VDS 50 of adapter 44.

As will be evident from further descriptions of the device interface logic circuitry, the virtual device storage array maintains the status information for logical adapters which are not presently active. As only one logical adapter may be working at a given time, and granted access to one of the data buses 48 and 49, there is a high probability that the information will be in the virtual device storage array. If an attempt is made to obtain information about a logical adapter currently employed in activity with a channel, that information will also be transferred over the device information bus 53 from different registers, identified as real registers contained in the adapter 46. In the case of the channel adapter requesting a link, this information may also be in the real registers.

Associated with each interface is an OEMI channel interface 55 which will provide the standard command tag and data structure necessary to communicate with the OEMI channel. This OEMI channel interface 55 receives from its connected channel 40, an address representing both this channel adapter 44, the most significant plurality of bits, and the address representing a pair of logical adapters for connection with another channel, the least significant plurality of bits. Thus, the OEMI logic is able to determine for which of the other channel adapters a given transaction is destined, and when the various architected criteria are met, request a link with the correct other channel adapter over one to the data buses 48 and 49.

Figure 3A:
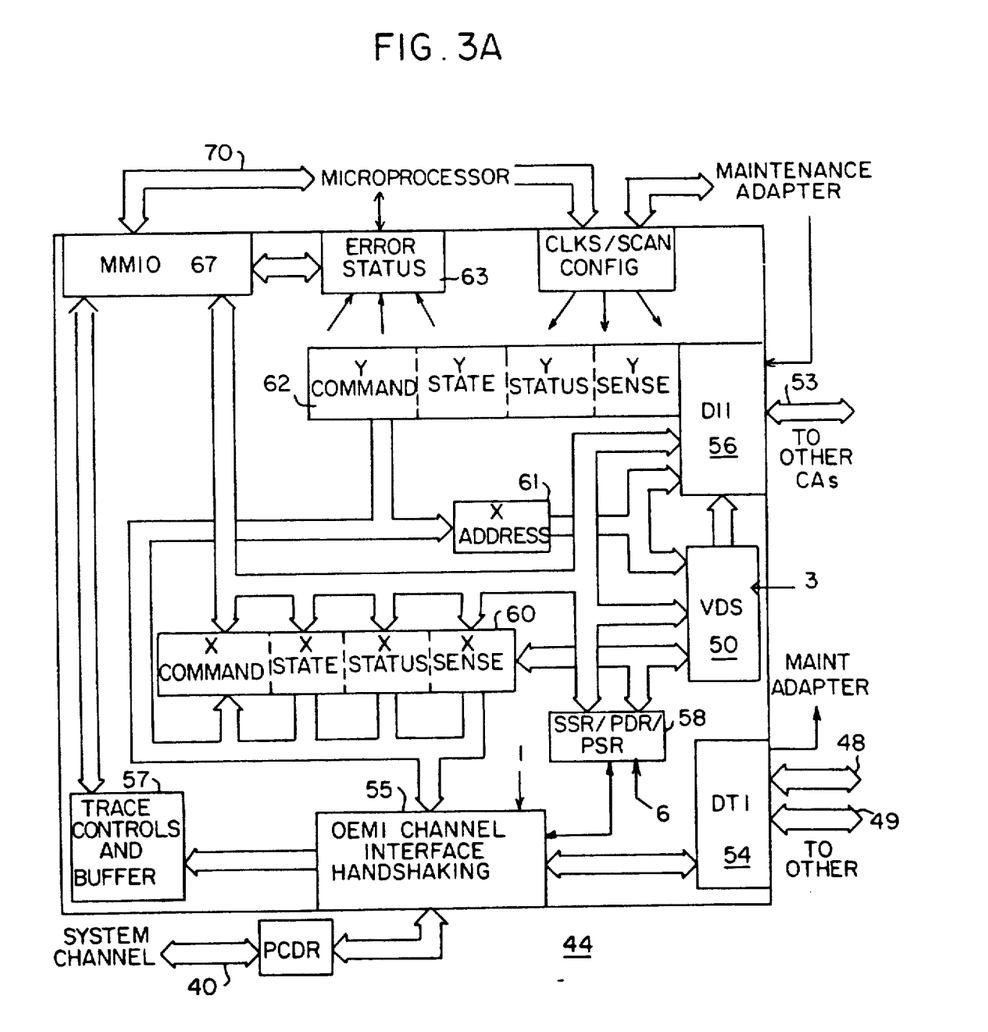
FIG. 3A is an architectural illustration of a channel adapter used to couple a channel to another channel adapter.

The organization of each of the channel adapters is shown more particularly in FIG. 3A. The OEMI channel interface 55 is shown which will provide the required protocol signals to the system channel 40. Once a communication link has been established between a channel adapter and another channel adapter, the data transfer interface 54 is enabled to permit the system channel data to be forwarded over one or the other of the data transfer buses 48 and 49. In establishing the requested communication link between a channel adapter and another channel adapter, system channel 40 first identifies which logical adapter pair will be used to establish the communication link. This address is stored by the OEMI channel interface 55 in address register 61. The stored address identifies an X logical adapter associated with the channel adapter of the requesting channel, and a Y logical adapter of an adapter connected to a destination channel. Register 61 is used to address the VDS 50 of the channel adapter 44, and the command, state, status and sense information associated with the X logical adapter will be read from VDS 50. The X logical adapter information is stored in registers 60.

Next, the system channel 40 identifies the type of operation to be performed via the X logical adapter. The operation is identified when system channel 40 sends a command byte to channel adapter 44. The OEMI channel interface 55 stores the command byte in the X command position of registers 60. At this point, all information regarding the X logical adapter and the current system channel 40 request is known.

In order to decide whether or not the current channel 40 request can be handled, information concerning the Y logical adapter must be obtained over the device information interface bus 53. Address register 61 of channel adapter 44 is also used to identify the channel adapter and specific logical adapter for which the information will be acquired over the DII bus 53. After acquiring the DII 53 and addressing VDS 50, or register 60 of the second channel adapter, the current command, state, status and sense information of the Y logical adapter is transferred via the DII bus 53 and DII 56 to register 62. Thus, all information pertaining to the current state of the Y logical adapter will be found in channel adapter 44 register 62.

Now that the current state of both the X and Y logical adapters is known, a decision can be made as to how channel adapter 44 will respond to the command issued by system channel 40. If the proper architected conditions are found to exist for both the X and Y logical adapters, then an interrupt may be posted via MMIO interface 67, informing the microprocessor 39 that a data bus link with channel adapter 46 is requested.

Figure 3B:
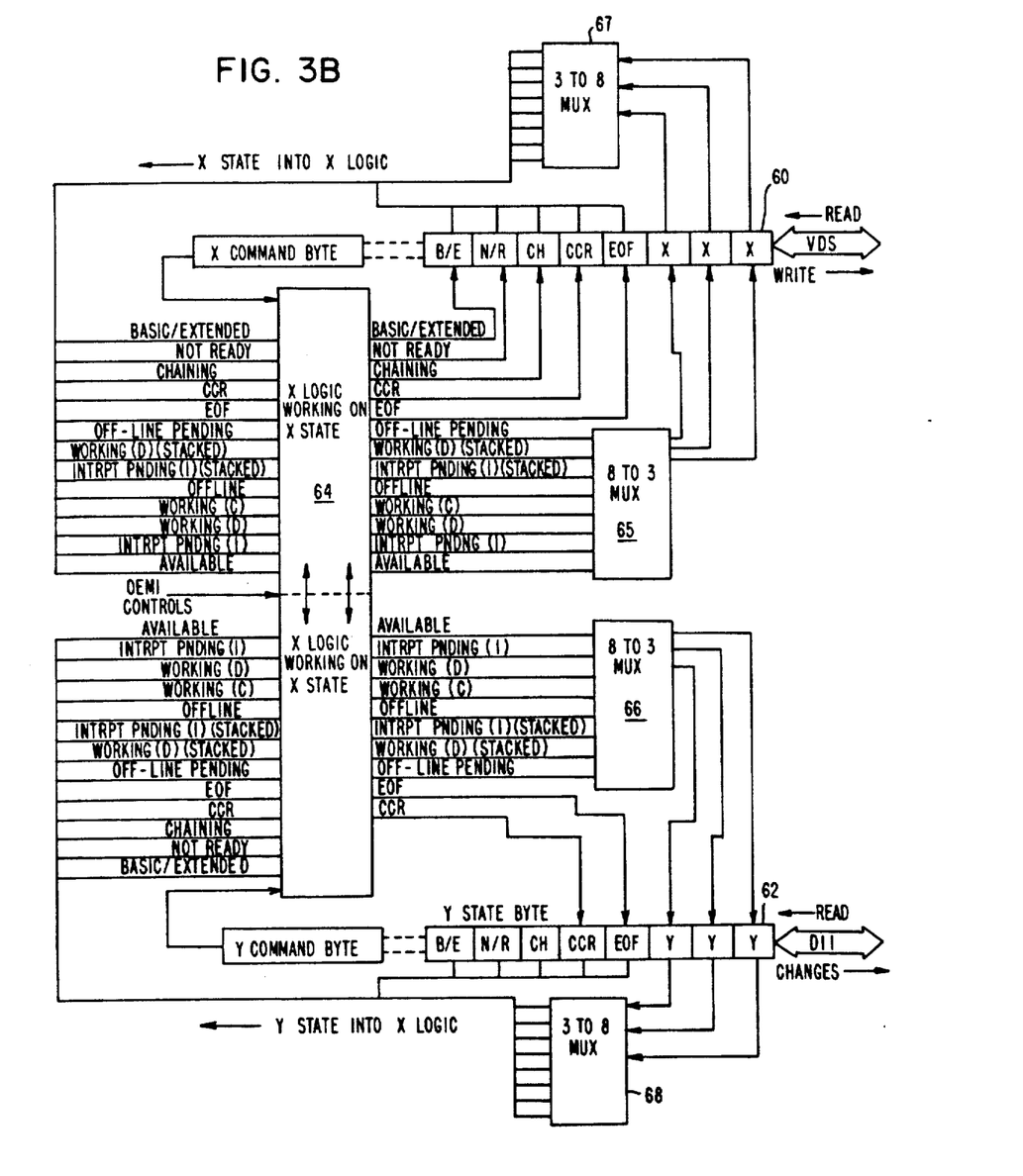
FIG. 3B illustrates decisional logic circuitry for comparing the state of logical adapters which are to be linked together.

Referring to FIG. 3B, there is shown a logic circuit 64 for accomplishing several tasks of the process of determining whether or not a link request interrupt should be issued to the microprocessor 39. The logic 64 can make a comparison between the X and Y command, state, status and sense bytes of the logical adapters for which a communication link is sought. If the command issued by system channel 40 is either a READ, READ BACKWARD or WRITE type command, and the appropriate architected conditions prevail in the remaining bytes of X and Y information contained in registers 60 and 62, respectively, then the logic circuit 64 will issue a signal to the OEMI interface logic 55, indicating that the X logical adapter may accept the pending channel command. The OEMI interface logic 55 will then present a byte of status information, generated by logic circuit 64, which will indicate to the system channel 40 that the command has been accepted for immediate execution by the X logical adapter 44. Once this initial status is accepted by the channel 40, the OEMI interface 55 issues a link request via the MMIO port as an interrupt to the microprocessor 39. This will be recognized and handled as a link request by the microprocessor 39.

As the logic circuit 64 creates the response to the system channel 40, it also will change the state, status, and sense bits, when appropriate, pertaining to the X and Y logical adapters reflected in registers 60 and 62. For instance, if the available condition was determined to prevail for both X and Y logical adapters, and a READ or WRITE was issued by the channel, logic circuit 64 would update the bits in register 60 to a Working (D) state. Thus, the logical adapter information on the X adapter side would be updated to the appropriate architectural status for permitting the command to be accepted and executed. Other states for the logical adapter are shown in FIG. 3B, and may be entered, depending upon the relationship between the X and Y logical adapter information contained in registers 60 and 62, and depending on the command issued by the connected channel 40.

It should be noted that the set of commands capable of being executed by the channel adapters of this invention include commands requiring no data path assignment. The majority of the command set, however, does require that the logical adapter being addressed be able to acquire the architectural status of the appropriate other logical adapter via the DII 56 and the DII bus 53 as illustrated above, in order to appropriately respond to the channel command.

A set of MUXs 65, 67, 66, 68 is shown only to indicate that encoding is employed for the various states indicated in the working logic 64. Logic circuit 64 may also alter the Y logical adapter state, status and sense information when responding to an X channel 40 command. This is accomplished when change byte information is sent across the DII interface 53 after logic circuit 64 has formulated the response to the channel 40 operation. In the above example, if the available condition was determined to prevail for both the X and Y logical adapters, and a READ or WRITE command was issued by the X channel 40, logic circuit 64 would formulate change bytes which would alter the Y logical adapter state and status bytes to reflect a pending attention interrupt condition.

The altered status byte caused by the aforementioned change bytes destined for the Y logical adapter result in the setting of SSR/PDR/PSR register 58 in the adapter associated with logical adapter Y. This will force the OEMI interface 55 to recognize that there is a request for connection to a respective logical adapter, and signal its respective system channel to examine and service the request.

Once the channel 43 recognizes and services the attention condition for the Y logical adapter, application software running on the system attached to channel 43 is relied upon to determine the cause of this condition. System software accomplishes this by issuing architected channel to channel adapter commands to the Y logical adapter over channel 43.

The response of the Y logical adapter to these commands indicate what type of command is pending in the X logical adapter. The system software communicating with the Y logical adapter is then relied upon to issue a complementary command over channel 43. By complementary commands, one of the most common would include a READ request to one logical adapter and a WRITE request to the corresponding other logical adapter. Thus, if the application software communicating with the Y logical adapter responds with a WRITE command to the logical adapter while a READ command is pending on the X logical adapter, the channel adapters will have met a criterion for connection via a data bus 48 or 49. Alternatively, this criterion can be met by the VDS 50 in channel adapter 46 having stored therein the status of the Y logical adapter as having a pending WRITE command prior to issuance of the READ command on the X logical adapter.

Acceptance of the WRITE command by the Y logical adapter is indicated to connected channel 43 via the presentation of an architected status byte to the channel. Upon acceptance by the channel 43, a link request interrupt is generated by the logical adapter indicating its readiness to exchange data with the corresponding X logical adapter. Microprocessor 39 must now determine whether or not more global concerns will permit the link to be established.

Also shown in FIG. 3A is a trace control and buffer 57, which is the subject of U.S. patent application Ser. No. 07/575,578 (EN990-027). The trace control and buffer is a diagnostic tool which can record the state of the OEMI channel interface, as well as other important criteria such as the time certain conditions exist on the channel interface, commands existing on the channel interface, and other associated data. The trace control and buffer 57 is controlled by the MMIO interface 67. The trace control and buffer 57 will begin recording events based on criteria received from the microprocessor 39. Additional commands on the MMIO interface 67 from the microprocessor 39 will read out the trace data, and pass it along to a support processor (not shown) where formatting and presentation of the data allow reconstruction of the channel interface activities for problem analysis. FIG. 2 illustrates a LAN interface 68 which permits the programming of microprocessor 39 from a support processor (not shown) connected to the LAN. The support processor can read out any error data collected by the microprocessor as well as any trace data read by the microprocessor 39. The ROM 69 maintains permanent instructions for microprocessor 39 to permit it to be accessed by the support processor. ROM 69, SRAM 70 and DRAM 71 are connected via an internal memory bus 72 to microprocessor 39. Operating code received from the support processor resides in DRAM 71, while the SRAM 70 holds temporary data for the microprocessor 39.

Before describing the operation of microprocessor 39 for acting on the request for a link more specifically, a detailed example of the foregoing adapter to adapter data transfer of logical adapter status information for determining whether a link request is to be formed will be described.

Figure 4:
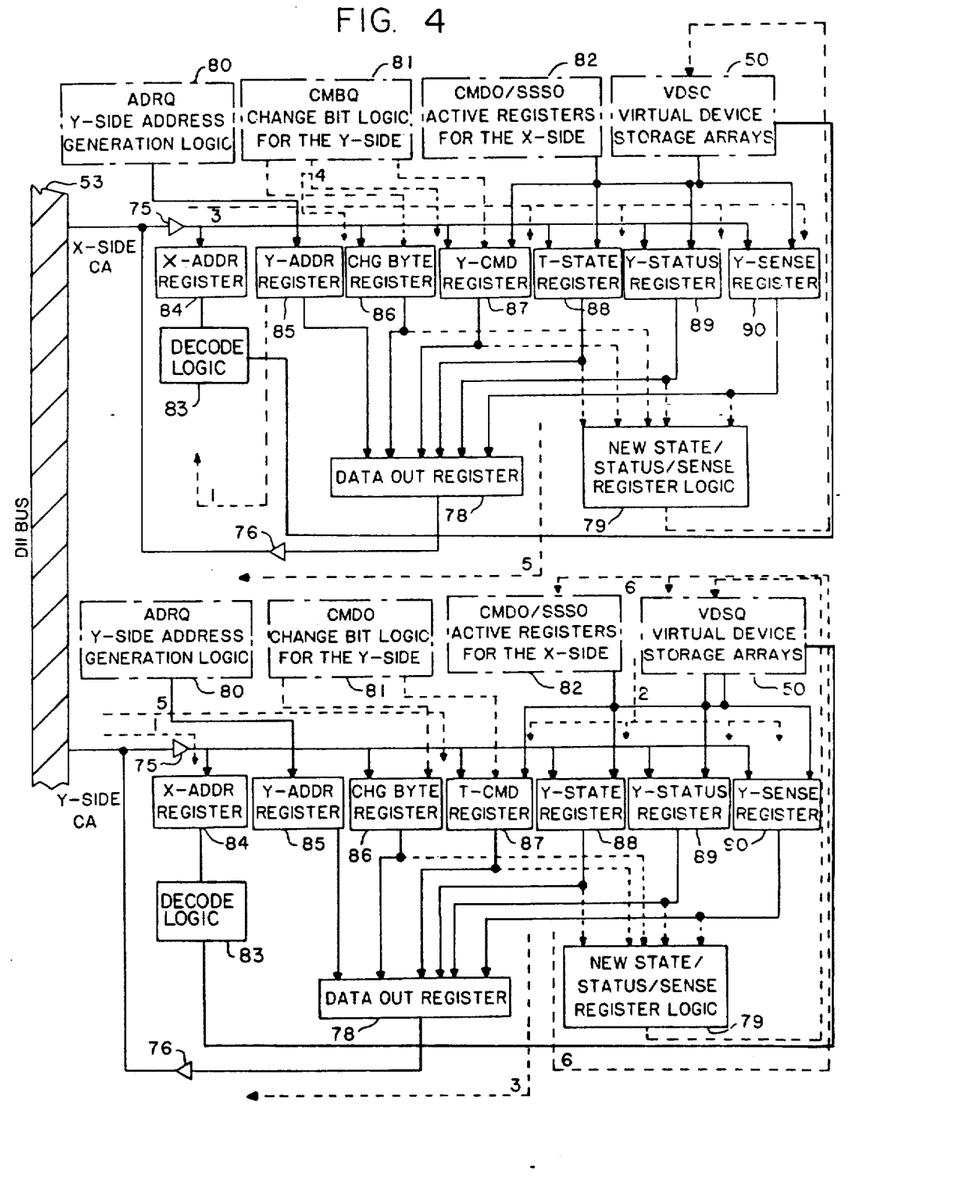
FIG. 4 illustrates the device information interface interconnecting each channel adapter.

The device information interface 56, which permits any channel adapter to obtain the status and information relative to a logical adapter (device) for which a connection is proposed, is shown more particularly in FIG. 4. Referring to FIG. 4 there is shown the device information interface logic found on two channel adapters, an X and a Y channel adapter. The X adapter is assumed to be the adapter connected to a channel originating a request to connect with a channel connected to the Y side adapter. The two channel adapters involved in a proposed communication link between the X-side channel adapter and the Y-side channel adapter are interconnected by the device information interface bus 53 (hereinafter DII bus). Assuming that a successful arbitration for access to DII bus 53 has been made by the X-side channel adapter, information regarding the proposed second half of the communication link may be derived from the Y-side channel adapter.

The device information interface logic circuit of each channel adapter includes an address register 85, shown as a Y-address register. The Y-address register is the register containing the address of the logical adapter on the Y-side, i.e., the side which will make up the second half of the communication link. Assuming that the request is being originated at the X channel adapter, the Y-address register 85 will generate the address for the logical adapter in the Y-side channel adapter. The data out register 78 will, through the line driver 76, send the requested logical adapter address down the DII bus to the Y-side. A data receiver 75 will load what is shown as an X address register 84 with the address identifying the logical adapter in the Y-side channel adapter for which a connection is proposed. Only one channel adapter will recognize this address as identifying a logical adapter for that adapter.

The logic circuitry 83, which is dedicated logic circuitry, will decode the X address register 84, and determine whether or not an entry is provided in the virtual device storage array 50 for the addressed logical adapter or in the active register 82. The virtual device storage array 50 maintains the command, status, state and sense byte information for every logical adapter associated with the Y-side channel adapter which is not currently involved in communication with its respective channels. A real register 82 contains the same information when a logical adapter of the Y-side channel adapter is presently involved in communication with its respective channel. An X address register 84 addresses the virtual device storage array 50.

Upon decoding of the address in the X address register 84, the related Y-side data is read from the virtual device storage array 50, or real register 82 to the registers 87, 88, 89, 90. The data out register 78, upon receiving a clocking signal, will drive the DII bus through the bus driver 76, with the required information regarding the Y-side logical adapter for which a link is proposed.

The foregoing logic circuitry of the X side channel adapter will request access to the DII bus 53 by contending for access to the bus. This contention is sensed at the maintenance adapter 37, and resolved on a simple sequential polling basis. An ENABLE signal from a contention resolution circuit, arbitrating the request for information from the DII bus 53 will grant access to the requesting X side channel adapter to address the Y side channel adapter.

Figure 5:
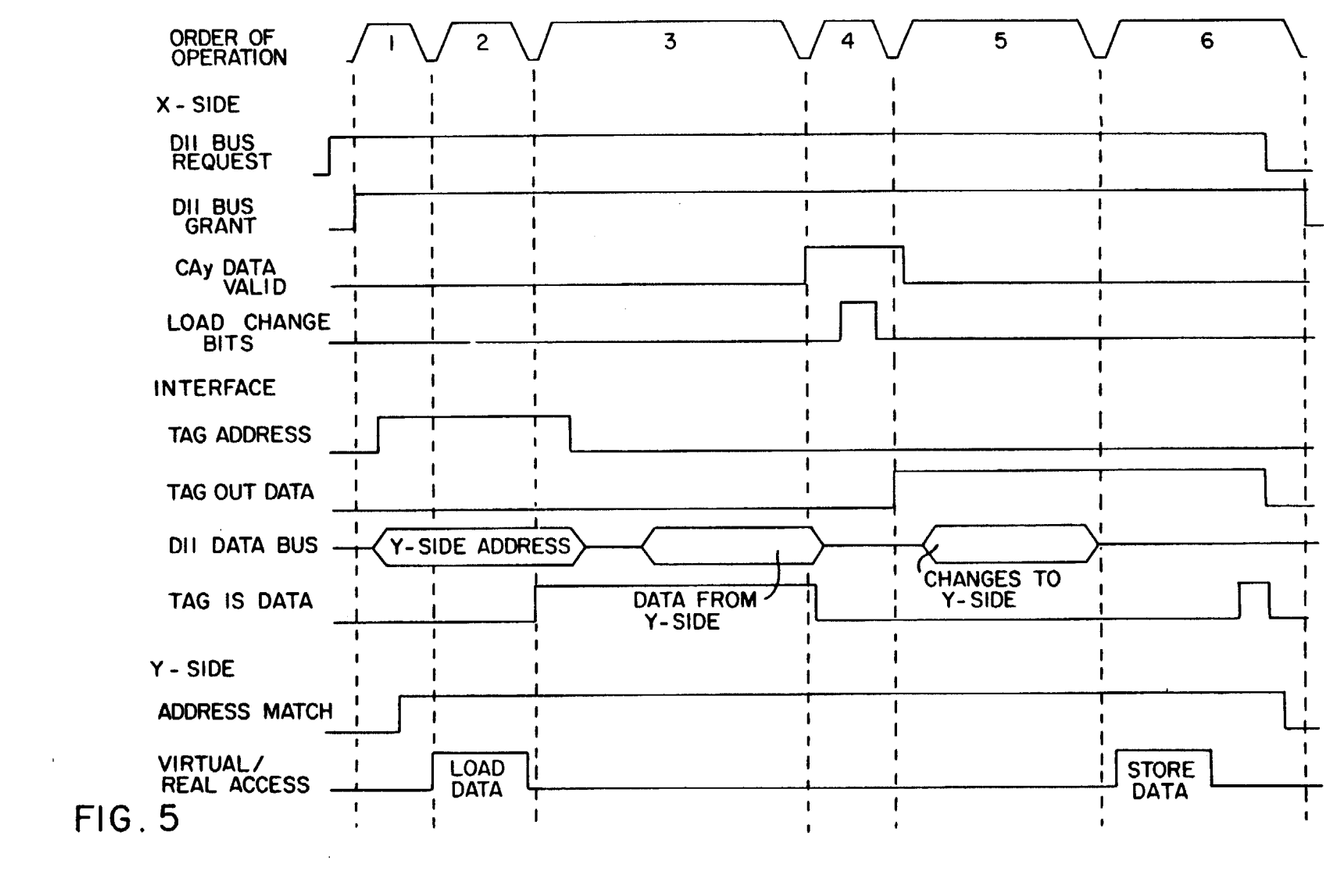
FIG. 5 is a timing diagram illustrating the operation of the device information interface of FIG. 4.

The operation of the foregoing circuitry is also described in FIG. 5, which illustrates a timing diagram for the operations labelled 1 through 6 on FIG. 4.

Referring to FIG. 5, the DII bus request signal is shown asserted on the X-side channel adapter. Once the bus arbitrator contained in a maintenance adapter 37 shown in FIG. 2 has granted access to the request, a bus grant line is enabled for the X-side channel adapter. At this point, data may be transmitted to the Y-side channel adapter identifying the address of a logical channel adapter for which command, status, state and sense information is required. The interface will carry the Y-side address and a line associated with the DII bus, the tag address line is raised during this Y-side address transmission.

Once the Y-side channel adapter recognizes its own address, received over the DII bus, the tag in data line will be raised. The information sought from the virtual device storage array 50 or real device register 87, 88, 89 and 90, in the case of a logical adapter currently involved in a communication with its channel, is loaded on the Y-side into the data out register 78. The data transmission from the data out register 78 may commence as soon as the address data line of the DII data bus is lowered. This will permit the data from the Y-side to be loaded to the X-side channel adapter via the DII bus 53. The X-side channel adapter receives the reply from the Y-side channel adapter, and validates the data during interval 4. The received data is entered in register 62 of FIG. 3A and applied to a change bit logic circuit 81 of FIG. 4 on the X-side channel adapter. The change bit logic circuit 81 is a portion of the dedicated logic 64 of FIG. 3B. For example, change bytes will be generated if the information presented by the Y-side channel adapter indicates that the Y logical adapter is available when the X logical adapter accepts a READ, READ BACKWARD or WRITE command. If so, change bytes are transferred to the Y-side channel adapter, changing the status of the Y logical adapter for which the operation is sought. These changes to the Y-side are applied to the change byte register 86 and Y-CMD register 87, and transferred to the data out register 78. These data bits are transferred over the DII bus 53 as change bytes to the Y-side. The change bytes apply updates to the Y logical adapter information, and this data is stored in the virtual device storage array 50 at the Y address corresponding to the logical adapter for which the operation is sought.

The received information is applied via a new state/status/sense register logic circuit 79 to update the virtual device storage array 50. In the event the logical adapter is engaged in a current transaction, this information will be stored in the real registers 82 for the Y logical adapter.

Thus, information has been received and acted on by the X-side channel adapter to generate a request for status information to the Y-side logical channel adapter. The status of the Y-side logical adapter, which will complete the link, has been changed from a state indicating it is available, to a state indicating there is a transaction pending at the X logical adapter, the completion of which depends upon a complementary command being issued to the Y logical adapter by its channel. Additionally, the Y logical adapter status byte is changed to signal to the OEMI channel interface to assert an ATTENTION interrupt to the channel, thus bringing the channel's attention to potential traffic via the Y logical adapter.

Having thus determined, at the channel adapter level, that the proposed communication link is possible because both the X and Y logical adapters are in a proper architected state, both logical adapters may therefore request a link assignment of one of the data transfer buses 48 and 49.

Figure 6:
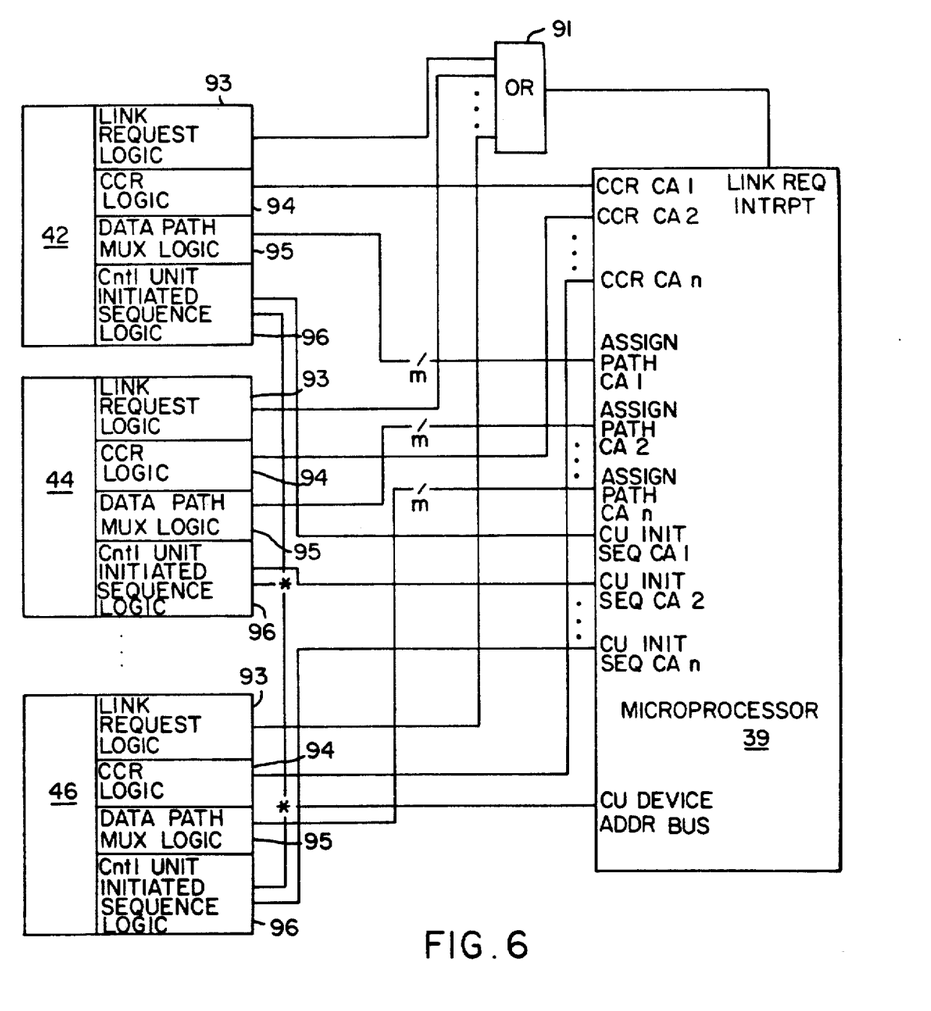
FIG. 6 is an illustration of the control sequence between channel adapters and a supervisory microprocessor which permits global supervision of traffic between channel adapters.

Each of the channel adapters has link request logic associated therewith for generating an interrupt to the microprocessor 39 such as to request a bus link 48 or 49 between the channel adapters for which the link request was issued. Referring now to FIG. 6, there is shown each of three channel adapters connected to microprocessor 39, the fourth 45 being omitted for clarity. These connections to the microprocessor are all part of the MMIO bus 70 as shown in FIG. 3A. The microprocessor connections include a dedicated line from each channel adapter from link request logic circuits 93 through an OR gate 91. FIG. 6 illustrates the connection of each link request logic circuit generating the link interrupt. Each of the channel adapters is connected via the microprocessor bus 70 to the microprocessor 39.

The bus 70 permits the logical connection shown in FIG. 6 to be made to each of the channel adapters to provide global supervision over channel adapter requests for links.

Link request logic associated with a channel adapter, generates an interrupt to the microprocessor 39. The particular interrupt level is identified by the microprocessor 39 as a request for a link. When this link request interrupt is received from OR gate 91, the MMIO bus 70 will perform a polling of each of the channel adapters through the memory mapped I/O ports 67 (FIG. 3A) of each channel adapter to determine the logical channel adapter addresses, X and Y, from address register 61 of the adapter CCR logic 94. The identity of the logical channel adapters which generated the interrupt is received in the MMIO bus 70 in response to the polling command.

The microprocessor 39 will then commence to form a link table which will assign one or the other of buses 48 and 49, to a pair of pending link requests between two channel adapters involved in the link. The microprocessor will post a command over MMIO bus 70 to a channel adapter issuing a link request interrupt when entry to the link path assignment table is denied. This will be in the form of a RETRY command, indicating to the OEMI channel interface that the channel adapter link request has been denied, and that the requesting channel reissue the command at a later time.

When a given link request interrupt is added to the link request table, it indicates that the correct global conditions seen by the microprocessor 39 suggest the efficient use of a data bus by the logical adapter X, requesting the path. If the corresponding Y logical adapter has not as yet requested a data path via the link request interrupt, the microprocessor 39 will attempt to force the presentation of any status which may be pending for the Y logical adapter at the soonest available opportunity. This is accomplished via microprocessor 39 communication with the control unit initiated sequence logic 96 of the Y channel adapter. This logic is employed to inform the channel that the Y logical adapter has pending status to present. This will be described more completely with respect to the count register 141 of FIG. 8 on each channel adapter.

If the matching Y logical adapter has already requested a data path via a link request interrupt, and the data transfer commands are determined to be complementary by the microprocessor 39, the link request by the X logical adapter will be added to the link request table, and one of data buses 48 and 49 will be assigned for the exchange of data. This assignment causes the appropriate data path MUX logic circuits 95 of FIG. 6 to be enabled on both the X and Y channel adapters.

Figure 71:
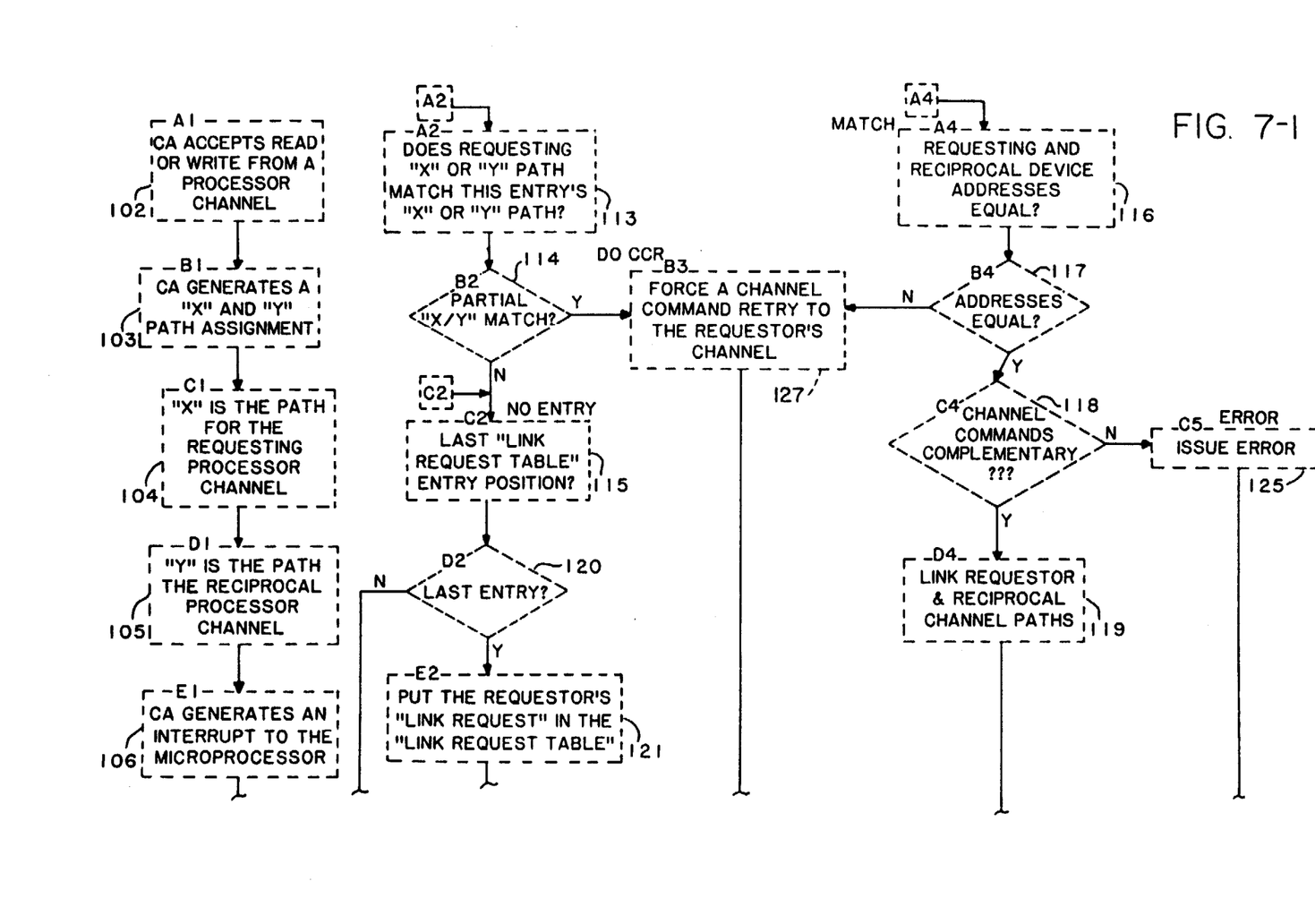
Figure 72:
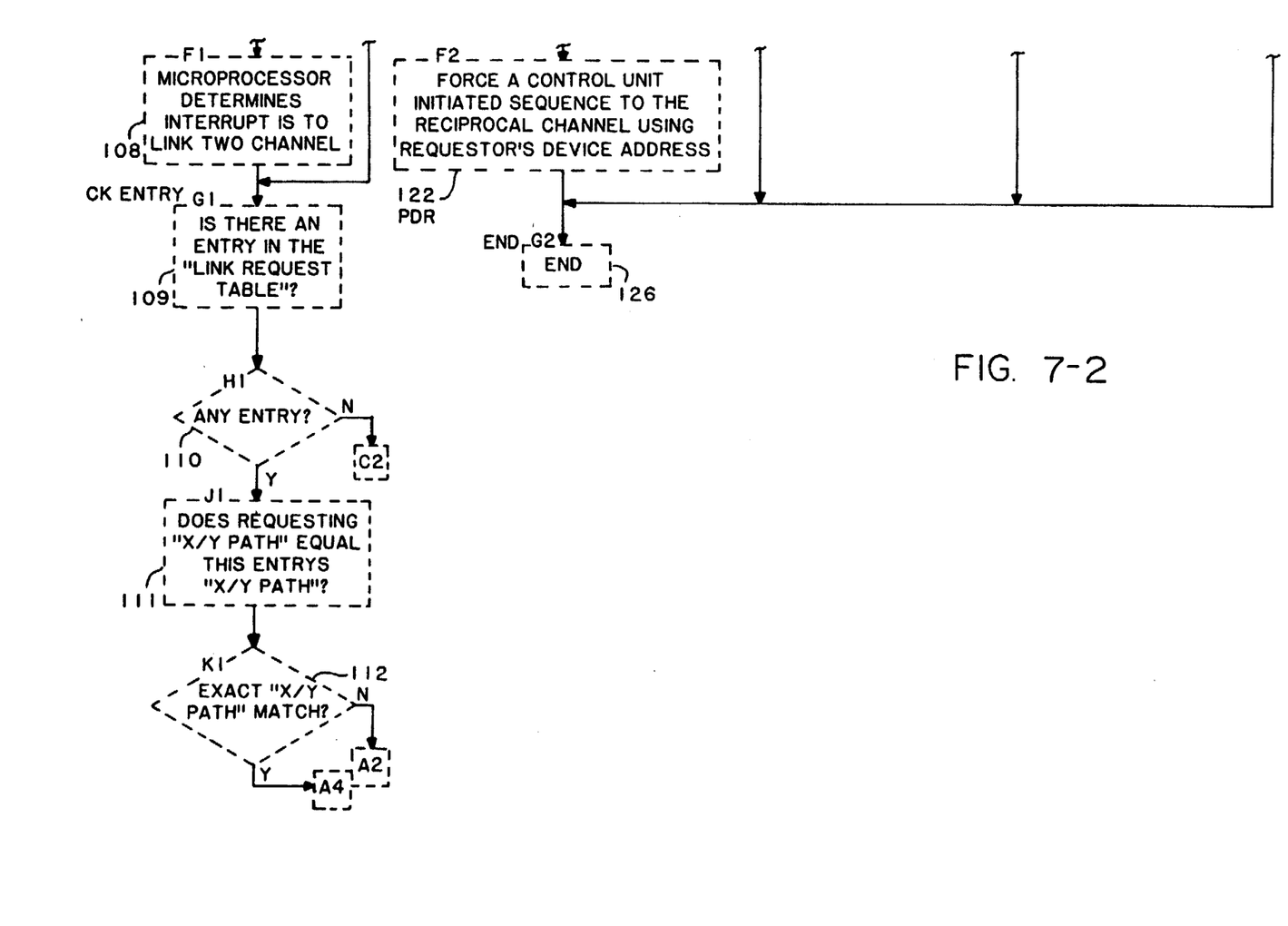

To complete the discussion regarding the assignment of a data bus to each link request, FIG. 7 illustrates a flow chart of programming steps executed by the microprocessor 39 to determine whether or not a link request is eligible for entry in the request table, and will therefore receive assignment of a data bus 48 or 49.

As an overview of the path assignment criteria represented by the flow chart of FIG. 7, numerous decision blocks 112, 114 and 117 are essential in determining whether or not a channel adapter receives priority for entry into the link request table. The first can be seen as a determination in step 112 as to whether or not the X channel adapter request exactly matches a previous entry in the link request table. If not, there is a determination as to whether or not this is a partial match in step 114. A partial match means a pending request in the link request table wherein one of the adapters involved in the subsequent request is part of an earlier-received request. If so, the program forces a channel command retry to the requester's channel in step 127, which will cause this attempt to be tried again at a later time, when presumably the earlier request would have been completed. If not, the current X channel adapter link request will be added to the link request table if all other table entries have been checked and no exact or partial matches were found.

Another way in which a link request will be added to the link request table is if the current X channel adapter request exactly matches a previous entry in the link request table. A check is then made to see if the logical adapter addresses active in the X channel adapter, and the channel which had the matching entry in the link request table constitute a matching X-Y logical adapter pair. If so, a second verification is made in decision block 118 to determine that the channel commands are complementary for this link request. This was checked at the device level and, in the event there is not a match, an error is present and is issued by the microprocessor. If the channel commands are complementary, step 118 will permit the request to be added to the link request table and assignment of a data path to the requesting X-Y channel adapter pair.

Having thus described the principal conditions imposed on granting a link request, the steps of FIG. 7 will be described in more detail.

Block 102 represents the condition where the channel adapter accepts a READ or WRITE from a processor channel. This results when the channel protocol signals a channel adapter for access to a second channel associated with another channel adapter. In step 103, the channel adapter will identify the channel adapters for which a communication path may be requested. In step 104, X is defined as a logical adapter for the channel adapter of the requesting channel, and Y is defined in step 105 as the path for the processor channel serving as the destination for the request. Once the device level architected conditions have been satisfied, as described in connection with the operation of the device information interface 56 and the logic circuit 64 of FIG. 3B, the channel adapter can generate an interrupt in step 106 for the microprocessor. The interrupt has a level defined such that the microprocessor can determine in step 108 that the interrupt is a request to create a link between two channels.

At this point, the microprocessor 39 will execute a routine to determine whether or not the link request would be entered in a link request table in light of criteria as to the status of channel adapter to channel adapter activity.

The first criterion determined by the microprocessor is represented in step 109 and decision block 110. In this situation, any previous entry to the link request table will force a consideration as to whether or not a partial or exact match exists between the current request for a link, and a previously stored request for a link between logical channel adapters. If there is no exact or partial match in the link request table, as determined in step 109 and decision block 110, control shifts to step 115. Each link request table entry is examined and if the current entry is the last one, the requestor's link is added to the request table in step 121. In step 122, the microprocessor will force a control unit-initiated sequence to the control unit initiated sequence logic 96 of the reciprocal channel, using the requestor's device address. This is effected in step 122 by having the microprocessor 39 over the MMIO bus 70 forcing the address of the logical adapter into the count register 141 (FIG. 8) of the channel adapter connected to the reciprocal channel. The pending status storage register 140 for this channel will then present an interrupt to the channel from the link request logic 93, indicating that a link to the channel is being requested.

When a previous request has been entered in the link request table, the previous request is compared with the new request to determine whether or not a channel adapter of the new request is involved in a previous request. If there is an exact match, i.e., channel adapters of the previous request are the same as those of the subsequent request, the control path identified by step 116 is entered, wherein it is determined whether or not the logical adapters involved in each of the requests are the same. In step 117, if these addresses are determined to be equal, the channel proceeds through a verification in decision block 118 if the channel commands are complementary. The microprocessor 39 through the MMIO bus 70, reads the contents of a command register of each channel adapter to verify that the logical adapters have complementary commands. As this criteria was checked at the device level, any non-complementary commands are deemed to be in error, and the processor 39 issues an error indication in step 125.

If, in decision block 112, only a partial match was found between a pending request and the newly-received request, step 113 and decision block 114 determine whether there is a partial match, and force in step 127 a RETRY channel command to the partially matched channel.

If the channel commands are found to be complementary in block 118, then the link request is entered in the link request table in step 119, and one of the two data paths 48 and 49 is assigned to the channel adapter pair. The link requests are taken in turn, in the preferred embodiment, so that assignment of one of the two data paths 48 and 49 to the involved channel adapters of a link request may be effected.

Figure 8:
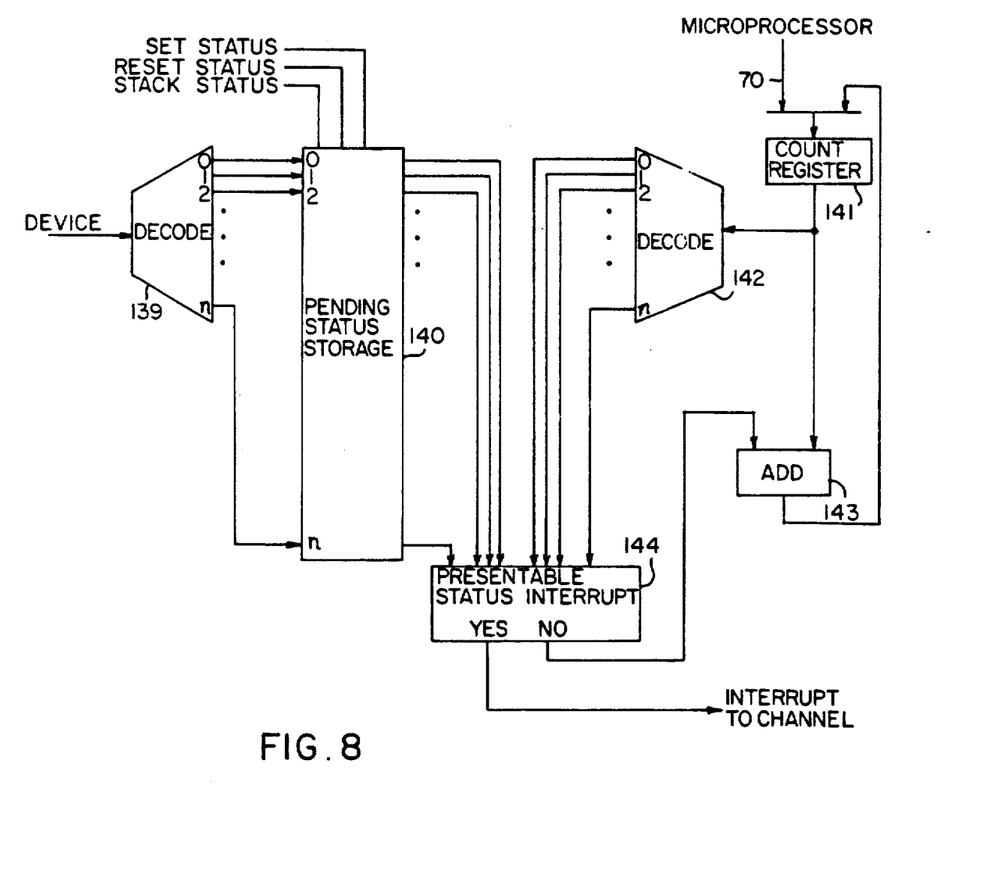
FIG. 8 is a block diagram of the pending status register associated with each channel adapter for presenting status to a connected channel.

Once the link request has been entered in the table, via step 121, the microprocessor 39 will take action to insure that the next logical adapter to be active on the Y channel (the channel for which a communication is sought by an X channel) is the matching logical adapter by setting the pending device register for the Y channel adapter in step 122. Referring to FIG. 8, there is shown a pending status storage register 140 with an address pointer 141. The microprocessor 39 connected via the MMIO bus 70 will force the logical channel adapter address into the count register 141. The count register 141, having been thus set, and which is subsequently incremented by an ADD network 143, decodes the address of a logical adapter having status to present to its connected channel and applies it to status logic circuit 144.

A pending status storage register 140 includes a memory location for each logical adapter of a channel adapter, which can receive two bits of status information. The pending status storage register 140 is set when any status bit is enabled by the change bytes sent by the X channel adapter to change the status of a device (logic adapter) in virtual device storage. For example, at the time the Y logical adapter is written back to the virtual device storage array after the change bytes are processed by the Y channel adapter, the state and status of the Y logical adapter is changed from an available state to an interrupt pending state with attention status when a READ, READ BACKWARD or WRITE command is accepted by the X logical adapter. The address applied to the virtual device storage array is also applied to the decode circuit 139. The simultaneous presentation of the status bit to the pending status storage register and the address for the logical adapter whose status is being updated, as provided by decode circuit 139, sets a pending status condition in the pending status storage register 140.

Thus, each of the logical devices has a location in pending status storage register 140 to indicate if the logical adapter has status to present to its connected channel. The pending status bits are presented at the output of the pending status storage register 140, where they may be compared with the decoded contents of count register 141.

It is therefore clear that as the count register 141 is forced to receive an address identifying a particular logical adapter for which a link request is pending, this will result in a presentable status interrupt being generated from logic circuit 144, gated by the decode circuit 142. Thus, each of those logical adapters has a status to present to its channel. The output of the pending status register is continuously scanned, and when pending status is found, it is presented for the logical adapter identified by the count register 141 to its OEMI protocol logic. At that time, the logical adapter can be made real by the OEMI protocol logic when the status presentation sequence is honored by the OEMI channel. This procedure requires a transfer of the data contents for the logical adapter from the virtual device storage array to the real register 60 shown in FIG. 3A. At this point, the logical adapter represented by the count register 141 has become connected to the channel.

Thus, there has been described an apparatus which will permit the formation of multiple logical adapters representing I/O devices of a connected channel. These devices may be connected together in accordance with criteria which will enhance the efficient transfer of data between channels.

Having thus described our invention, what we claim as new and desire to secure by Letters Patent is:

1. A device information interface for a I/O device having a plurality of channel adapters of a channel to channel I/O device, each channel adapter being connected to a channel, said channel adapters being interconnected with a plurality of data buses under control of a control microprocessor, comprising:

a device information interface bus interconnecting said channel adapters;

a virtual device storage array for storing the status of each logical channel adapter of a channel adapter connected to said channel;

logic decoder connected to said device information interface to decode inquiries received over said device information interface bus from another adapter, and address said virtual device storage array to derive status information regarding a logical adapter of a channel adapter; and, an output register connected to receive said status information from said virtual storage array and present said information to said interface bus for transmission to said another adapter, permitting said another adapter to determine the status of said logic adapter before requesting a link with said logical adapter.

2. The device of claim 1 further comprising a set of change byte registers for receiving from another adapter change bytes for distribution to the receiving adapter's control registers to initiate seizure of a channel associated with the receiving adapter.

3. The device of claim 1 further comprising an arbitration bus interconnecting said adapters and an arbitration means connected to said arbitration bus for enabling one of said adapters to have access to the device interface bus.

4. The device of claim 1 further comprising first and second address registers on each adapter for holding an address identifying a first logical adapter in a channel connected to said adapter which is attempting to gain access to a second logic adapter of another adapter, and for holding an address identifying said second logical adapter.

5. The device of claim 1 further comprising:
a register for storing the status of a logical adapter currently active on the channel connected to the adapter; and,
means for transferring said register contents to said output register in response to an inquiry from another adapter for said connected logical channel adapter status.

6. The device of claim 1 wherein said virtual device storage array stores the status of inactive logical adapters of a connected channel.

7. The device of claim 2 further comprising means for updating said virtual device storage array change byte register contents.

8. A device information interface connecting adapters which form a plurality of logical adapters with a channel of a large scale computing system, permitting one adapter to determine the status of a logical adapter of another adapter comprising:
a device interface bus connecting each of said adapters;
a channel interface at said one adapter for receiving from a channel the identify of a logical adapter pair which are to be linked over a data bus and a command byte identifying the operation to be performed between logical adapters;
means for applying to said device interface bus the identify of one of said logical adapters of said another adapter;
a virtual device storage array at said another adapter for storing the status of logical adapters associated with said another adapter;
a logic decoder at said another adapter for decoding the identify of aid logical adapter on said device interface bus, and addressing a location in said virtual device storage array with said identify; and,
an output register at said another adapter for receiving logical adapter status information from said virtual device storage array, and applying said information to said device interface bus for transmission to said one adapter.

9. The device information interface of claim 8 further comprising:
a change byte logic circuit at said one adapter for providing data for updating the status of said logical adapter based on a comparison of said logical adapter status, received from said device interface bus, and for sending said change status data to said another adapter for updating said another adapter virtual array storage device to reflect a pending transaction with said one logical adapter.

10. The device information interface of claim 9 wherein said change byte logic circuitry produces change status data when said another adapter logical adapter status is compatible with said command of said channel.

11. The device information interface of claim 9 wherein said another adapter has a status byte register which signals a channel of said another adapter to issue a command complementary to a command issued by said one adapter channel.

12. The device information interface of claim 8 wherein said one adapter includes an interrupt generator which posts an interrupt for identifying to a supervisory processor a request for a data link between said logical adapter pair when said logical adapters of said pair have a complementary status.

13. A device information interface for permitting an adapter forming a plurality of logical adapters for a connected data channel to determine the status of a logical adapter of another adapter connected to a second data channel comprising:
a device interface bus connecting said adapters;
an address register at said one adapter for holding an address of a logical adapter of said another adapter;
arbitration means for obtaining access by said one adapter to said device interface bus;
output register means for applying said address of said logical adapter in said address register to said device interface bus, which is received at said another logical adapter and is decoded to apply status data regarding said logical adapter on said device interface bus; and,
a register at said one adapter for receiving said status data from said device interface bus.

14. The device information interface of claim 13 further comprising change byte logic circuitry at said one adapter, connected to said register having said status register, and applying change data via said device interface bus to said another adapter for updating the status of said another adapter logical adapter to reflect a pending transaction with said another adapter logical adapter.

15. The device information interface of claim 14 wherein said another adapter stores said logical adapter status data in a virtual device storage array.

* * * * *

UNITED STATES PATENT AND TRADEMARK OFFICE
CERTIFICATE OF CORRECTION

PATENT NO. : 5,206,936
DATED : April 27, 1993
INVENTOR(S) : Holland et al

It is certified that error appears in the above-identified patent and that said Letters Patent is hereby corrected as shown below:

In column 3, line 27, change "Manufactuers," to -- Manufacturers'--;

In column 14, line 45, delete "I/O device";
line 46, delete "having a";
line 57, after "interface" insert --bus--;
line 67, change "logic" to --logical--.

In column 15, line 41, change "identify" to --identity--;
line 47, change "identify" to --identity--;
line 53, change "identify" to --identity--;
change "aid" to --said--;
line 55, change "identify" to --identity--.

Patent Claim No. 12 is claim 11.
Patent Claim No. 11 is claim 12.

Signed and Sealed this

Thirty-first Day of May, 1994

Attest:

BRUCE LEHMAN

*Attesting Officer*  *Commissioner of Patents and Trademarks*